United States Patent [19]
Nelson

[11] 4,179,184
[45] Dec. 18, 1979

[54] ELECTROOPTICAL MODULATOR

[75] Inventor: Arthur R. Nelson, Troutville, Va.

[73] Assignee: Sperry Rand Corporation, New York, N.Y.

[21] Appl. No.: 891,651

[22] Filed: Mar. 30, 1978

[51] Int. Cl.² .............................. G02B 5/14
[52] U.S. Cl. ................................ 350/96.14
[58] Field of Search ..................... 350/96.14

[56] References Cited

U.S. PATENT DOCUMENTS

| | | | |
|---|---|---|---|
| 3,695,745 | 10/1972 | Furukawa | 350/96.14 |
| 3,795,433 | 3/1974 | Channin | 350/96.14 |
| 3,904,270 | 9/1975 | Cheo | 350/96.14 |
| 3,923,373 | 12/1975 | Dabby et al. | 350/96.14 |

*Primary Examiner*—Stewart J. Levy
*Attorney, Agent, or Firm*—Howard P. Terry

[57] ABSTRACT

An improved electrode structure is provided for electro-optical modulators applicable in multiple mode fiber light propagation systems. The electrodes form effective light guiding elements and, when appropriately excited, efficiently refract light away from the output port of the modulator. The improvement affords increased modulation depth, a lower driving power requirement, and an increased operating band width.

12 Claims, 4 Drawing Figures

ELECTROOPTICAL MODULATOR

BACKGROUND OF THE INVENTION

1. Field of the Invention

The present invention relates generally to electrooptical devices for directing the propagation of light energy and, more particularly, concerns light guiding apparatus for the amplitude modulation of light flowing in optical fiber light propagating systems.

2. Description of the Prior Art

In recent research directed to the development of guided wave optical modulators suitable for direct insertion in fiber optic communication systems, emphasis has increasingly been centered upon the generation of active components propagating all or most of the multiple mode energy characteristic of optical fiber propagation, thus avoiding the difficult problems associated with coupling such fibers to single mode active devices. Several concepts found in these programs demonstrate merit, for example, as optical guides. In general, these optical propagation devices employ a fixed voltage placed across an electrooptic crystal to produce an increase in the index of refraction of the crystal in a fashion such as to enhance propagation of light therethrough. If the crystal is instead subjected to a varying voltage, the voltage-induced wave guide serves as an amplitude modulator, since the strength of the light passed through the crystal will then depend upon the strength of effectiveness of the induced wave guide. With a large applied guiding voltage, the light output is strong; no guiding voltage or a reversed electric field results in a correspondingly small optical output because the light is not efficiently guided from the input to the output port.

One such high speed modulator is described by the present inventor and his co-workers D. H. McMahon and R. L. Grave in the technical paper: "Electro-Optic Channel Waveguide Modulator for Multimode Fibers", *Applied Physics Letters*, Vol. 28, No. 6, Mar. 15, 1976, pages 321 through 323. This prior art device consists of a thin transparent plate of Z-cut electrooptically active $LiTaO_3$ with opposed conductive strip electrodes evaporated on the opposed broad faces of the plate. Opposed edges of the plate are polished so that optical fibers may be butt coupled to form input and output ports for the modulators. The strength of the electric field readily controls the strength of effectiveness of the wave guiding channel lying between the two electrodes. The guiding region is desirably formed by the electric field to have substantially the same cross-section dimension of the active core of commercially available multimode optical fibers, permitting efficient coupling therebetween of the modes propagating within the optical fiber guides.

SUMMARY OF THE INVENTION

The present invention relates to electrooptically controllable modulators particularly for application in the control of the propagation of multiple mode light within fiber optical communication systems.

DESCRIPTION OF THE PREFERRED EMBODIMENT

Figure 1:
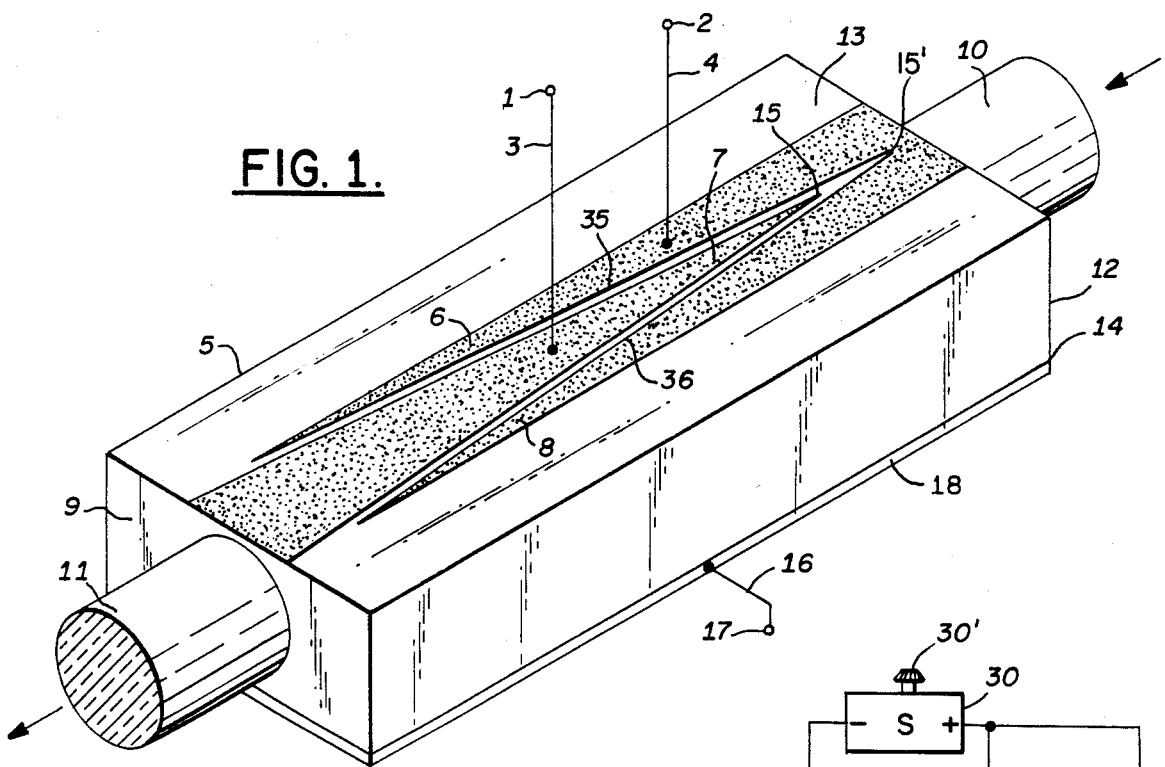
FIG. 1 is a perspective view of a first embodiment of the invention.

The multimode optical modulators of the present invention are improvements over prior art electrooptical modulators, including the aforementioned Nelson et al device, which improvements overcome difficulties inherent therein. As illustrated in FIG. 1, the electrooptical parts of the invention are formed on a thin plate 5 which may be Z-cut $LiTaO_3$, $LiNbO_3$, or a similar readily available electrooptically sensitive material. Electrically conductive electrodes are evaporated or otherwise formed using conventional techniques on each of the broad faces 13 and 14 of transparent plate 5. The electrode 18 on the bottom face 14 of plate 5 may simply be a thin metal film covering the entire area of the bottom surface, thus serving readily via lead 16 and terminal 17 as a ground or other reference potential electrode for the upper surface electrodes and forming individual capacitors with them.

The upper surface electrodes 7 and 6, 8 are readily formed simultaneously in insulated relation by conventional methods of evaporation of an electrically conductive metal such as gold, silver, or aluminum through a suitable mask. Electrode 7 has a generally triangular shape with its base at the polished edge 9 of plate 5 and is normally symmetrically placed upon surface 13. Symmetrically placed about the central electrode 7 is an electrode having a pair of pointed legs 6, 8 and an end at the polished edge 12 of plate 5. The legs 6, 8 form an open interior of triangular shape generally conformal with the triangular shape of electrode 7, with the apices 15, 15' of the two triangles lying in closely spaced apart relation near polished edge 12. Legs 6, 8 are electrically connected by electrode material lying between apex 15' and polished edge 12. Thus, electrode 6, 8 extends from the port at polished edge 12 to a vee-shaped electrically isolating gap between it and triangular electrode 7. Electrode 6, 8 cooperates with the bottom electrode plate 18 to form a wave guide in which optical energy readily propagates with respect to a fiber optic guide 10 butt sealed against the flat polished edge face 12 of plate 5. Similarly, the triangular electrode 7 cooperates with the bottom electrode 18 to continue the optical wave guide so that the optical energy readily propagates into a fiber optic guide 11 butt sealed in fixed relation against the polished output edge 9 of plate 5. The angles of apices 15, 15' are shown in an exemplary manner as a matter of convenience, and it will be understood that larger angles may advantageously be employed so that the gaps 35 and 36 are shorter than shown and so that the overall length of the device may be correspondingly short. It will be understood that fiber optic guides 10 and 11 as shown in FIG. 1 are cut normal to their axes and are affixed in butted relation against the respective flat edges of plate 5, being held there in any convenient conventional manner. In FIG. 1, it has been shown, merely by way of example, that fiber optic guide 10 serves as an input port, while guide 11 serves as the output port. It will be understood by those skilled in the art, however, that the reciprocity theorem applies to the configuration and that the functions of ports 10, 11, may readily be interchanged. It will be further understood that identical electrode patterns like electrodes 7 and 6, 8 may be applied to both faces 13 and 14 of the device, as will be further discussed. Further, in the embodiment of FIG. 1, the axes of the fiber guides 10 and 11 are colineal with the axis of the light path through plate 5.

Figure 2:
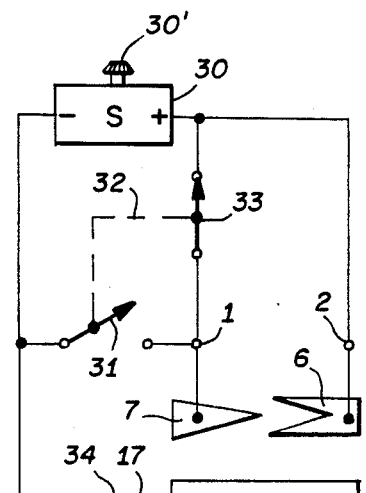
FIGS. 2 and 3 are wiring diagrams showing electrical circuits for operation of the invention.

Operation of the embodiment of FIG. 1 will be considered in connection with the simplified control circuit of FIG. 2, corresponding parts appearing in FIGS. 1 and 2 having the same reference numbers. The voltage source 30 represents a source whose output amplitude may be variable according to a predetermined program, as symbolized by control 30'. The positive terminal of source 30 is coupled to terminal 2 of upper electrode 6. It may also be coupled through switch 33, which may be an electronically controlled switch, to terminal 1 of upper electrode 7. The positive voltage may be removed when the ganged (32) switch 33 is opened and switch 31 is closed in its place so as to apply a negative voltage to upper electrode 7. Additionally, switch 34, which also may be electronic, may be used to couple the single lower plate 15 either to the ground potential level or to the negative terminal of source 30. Consider, by way of example, that switch 33 is conducting and that switch 34 is coupled to ground so that the lower electrode 18 is at that potential. Thus, with the positive potential applied to both upper electrodes 6 and 7, the region within plate 5 between the upper and lower electrodes acts as an efficient optical guide. The presence of the vee-shaped gaps 35, 36 between electrode 7 and electrode 6, 8 will present no material difficulty because of fringing electrical field effects; the net result is just as if the upper electrodes were completely joined together. Now, if switches 31, 33 are moved so as to place a negative voltage on upper electrode 7 while maintaining upper electrode 6 positive, then the electrode system creates a diverging electric field region in the gap region which deflects light away from the aperture of the output port. The light thus deflected by the consequent local change in index of refraction is multiply-reflected until it passes out into space primarily through the four narrow edges of plate 5, for example.

Figure 3:
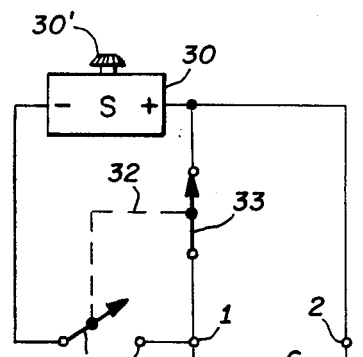

FIG. 3 illustrates a similar control circuit for use in operating a device having electrodes 6', 7' on the lower surface 14 duplicating the electrodes 6, 7 on the upper surface 13. In this embodiment, the single lower electrode 15 of FIG. 2 is replaced by electrodes 6', 7' and switch 34 of FIG. 2 is eliminated. According to the FIG. 3 device, electrodes on opposite sides of plate 5 are oppositely polarized, being connected as shown in the drawing of FIG. 3 so that electrodes 6', 7 are, for example, negative, while electrodes 6, 7' are positive when the refractive index is to be increased and light is to be scattered away from the aperture of the output port fiber 11, for example.

The practical value of the invention will become more apparent from the following considerations, bearing in mind the need for electrooptical modulators having minimum loss when in the maximum conducting state and short physical length in the propagation direction. In prior art devices, it has been recognized that light in the TE mode is less effectively controlled than TM mode light in $LiTaO_3$ and $LiNbO_3$ plates; thus, such devices do not yield sufficiently low effectiveness with reasonable voltages. One way to reduce losses, especially of the TE mode light, is to make the length of the modulator guiding structure as short as possible. A short structure makes the solid angle intercepted by the output fiber guide port larger with respect to that of the input fiber.

However, if the output solid angle of the prior art device is increased, the depth of modulation possible is accordingly decreased. This involves the factor that power transmitted through the device can vary between that collected geometrically according to solid angle considerations for no applied voltage and that collected if most of the TM mode light and a fraction of the TE light is forced to remain within the effective light guiding channel when the control voltage is applied. In eseence, the shorter the prior art electrooptic modulator, the greater is the input-to-output coupling efficiency, but the smaller is the depth of modulation because the light passage can not be entirely shut off.

In the present device, it is seen that the electrode system acts to spoil operation of the natural light guiding system, a reversed polarity voltage being used to sweep light out of the channel and to prevent that deflected light from reaching the aperture of the output fiber guide. With this approach, a short structure having higher input-to-output coupling can also have the desirable large modulation depth not effected in the prior art. Accordingly, it is seen that the simple structural changes introduced according to the present invention beneficially yield improved depth of modulation. In addition, because the control or modulation signal is now applied to an electrode with about one half the area of the modulating electrode of the prior art device, the capacitance and therefore the driving power requirements are halved. Accordingly, frequency response is also desirably doubled.

Figure 4:
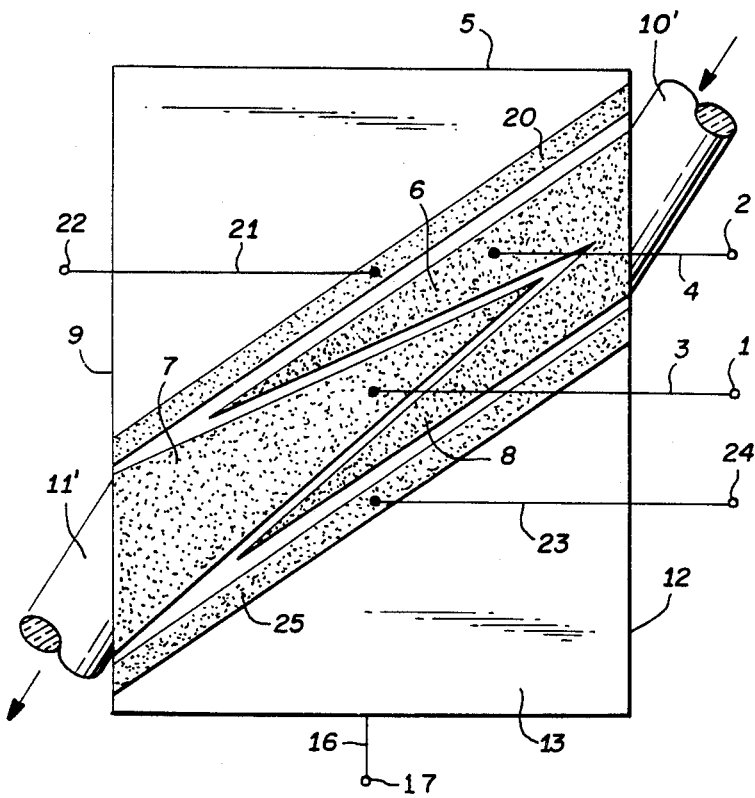
FIG. 4 is a plan view of a second embodiment of the invention.

It will be understood in connection with FIG. 4 that the invention is not limited to use in the configuration of FIG. 1, but that the spoiler electrode concept is also readily adaptable to use in an electrooptical modulator employing barrier electrodes for wave guiding purposes and with non-normal incidence of input and output port fiber guides for improved light collimation, thereby desirably decreasing input-to-output losses. In FIG. 4, parts corresponding generally to those already discussed in connection with FIG. 1 bear corresponding reference numerals, such as terminals 1, 2, leads 3, 4, electrooptic plate 5, upper electrodes 6, 7, 8, polished edges 9, 12, fibers 10, 11, and upper and lower surfaces 13, 14.

In the device of FIG. 4, improved light collimation is achieved by affixing the input and output fibers 10', 11' to the respective edges 9, 12 of electrooptically active plate 5 near opposite corners thereof so that the light path therethrough is in a generally diagonal sense. It is understood that a better collimated light beam can be injected into plate 5 by cutting fibers 10', 11', not at right angles to the fiber axes, but at angles of the order of 70° depending upon the relative indices of refraction of the respective fiber and plate materials. If, for example, the index of the core of fiber 10' is $N_F$ and that of plate 5 is $N_P$, with $N_P > N_F$, the collimation or beam area reduction factor is $N_P \cos \theta_P / N_F \cos \theta_F$. Here, $\theta_F$ is the angle of incidence on the plate edge 12 and $\theta_P$ is the median angle of the beam within plate 5, both referred to surface 12. Collimation factors from two to four may readily be achieved as discussed in the U.S. patent application Ser. No. 722,898 filed Sept. 13, 1976 in the names of D. H. McMahon and A. R. Nelson for a "Multimode Waveguide Device" and assigned to Sperry Rand Corporation. According to the latter McMahon et al invention, a means is provided for efficiently coupling multimode energy from fiber optical wave guides to planar optical wave guides such as plate 5. This coupling is accomplished by utilizing non-normal butt coupling between the fiber optical wave guide and the electrooptical wave guide, thereby accomplishing magnification between the diameter of the light beam and divergence in the optical fiber and the diameter of the light beam and divergence in the electrooptical wave guide. These magnifications establish propagation paths within a sufficiently confined region of the electrooptic wave guide so that the light energy may be desirably compacted in a small channel by the application of reasonable voltage levels.

As indicated, the path of propagation of light through the modulator of FIG. 4 is in a generally diagonal sense, but the axes of the path and of fibers 10', 11' are not colineal. The cooperating electrodes 7 and 6, 8 are arranged along the same quasi-diagonal, as shown. Such electrodes may be placed on one side or on both sides of plate 5, as in the instance of the FIG. 1 apparatus, so that the respective control circuits of FIGS. 2 and 3 may be employed.

In the device of FIG. 4, the path of light through plate 5 is appropriately even better confined by use of a special barrier electrode wave guidance means including the barrier electrode 20 and 25 supplied with an appropriate voltage via the respective terminals 22, 24 and leads 21, 23 from a voltage source (not shown). Such barrier electrodes and their light guiding capabilities are discussed in the A. R. Nelson U.S. patent application Ser. No. 796,103, filed May 12, 1977 for an "Electro-Optic Multiplexer with High Interchannel Isolation" and assigned to Sperry Rand Corporation. This latter device employs input and output fiber guides coupled to optical barrier wave guides formed by the application of steady voltages to electrodes positioned on the top and bottom surfaces of an electrooptic crystal to decrease the refractive index in the crystal between the electrodes and thus to form optical wave guides which are outlined by the electrodes. As in application Ser. No. 796,103, the barrier electrodes 20, 25 of FIG. 4 aid in forming a wave guiding channel and may be applied by evaporation to the upper surface 13 of plate 5 at the same time that electrodes 6 and 7 are formed, for example. A steady voltage applied between electrodes 20, 25 and the opposed electrodes or electrode 15 has a polarity such that a decrease in the refractive index is afforded in the space affected by the electrode fields. The change in index creates effective barriers defined by the electrode configuration which will reflect light incident thereon that has been launched in the region between the barriers, thus forming a more confining optical wave guide generally defined by the barrier electrode pattern, a wave guide more confining in the "off" state of the modulator than are electrodes 6 and 7 alone. Depth of modulation of the device of FIG. 4 may be further improved by modulating the voltage applied to barrier electrodes 20, 25 with a signal having a polarity reversed with respect to the modulating voltage supplied to electrodes 6, 7. The barrier electrodes 20, 25 and the improved collimation beneficially lower the required operating voltage for high output intensity, while enabling the structure of FIG. 4 to retain the advantages of the FIG. 1 embodiment; namely, greater modulation depth and increased band width with respect to the capabilities of the prior art. Both forms of the invention are, in practice, not more difficult to manufacture than the prior art device, since the somewhat more complex electrode structures of the invention are in fact as readily generated by a simultaneous operation as is the single strip electrode of the prior device.

While the invention has been described in its preferred embodiments, it is to be understood that the words which have been used are words of description rather than of limitation and that changes within the purview of the purview of the appended claims may be made without departing from the true scope and spirit of the invention in its broader aspects.

What is claimed is:

1. Optical modulator apparatus comprising:
   optically transparent plate means characterized by an electrically variable effective index of refraction,
   optical input and output port means for establishing a path for the propagation of light through said plate means, and
   a plurality of isolated electrode means for establishing variable electric fields through said plate means generally normal to said path for changing said effective index of refraction, thereby diverting corresponding portions of said light from said path and from said output port means,
   said plurality of isolated electrode means including first and second mutually coplanar electrode means,
   said first coplanar electrode means lying generally symmetrically at one side of said path and having a generally triangular shape,
   said second coplanar electrode means lying generally symmetrically at said one side of said path and having an internal shape conformal with said generally triangular shape for forming first vee-shaped gap means between said first and second coplanar electrode means, and
   said plurality of isolated electrode means including cooperating electrode means spaced from said first and second coplanar electrode means at a second side of said path.

2. Apparatus as described in claim 1 wherein said cooperating electrode means comprises:
   third and fourth electrode means in mutually coplanar relation,
   said third electrode means lying generally symmetrically at a second side of said path and having a generally triangular shape, and
   said fourth electrode means lying generally symmetrically at said second side of said path and having an internal shape conformal with said third electrode generally triangular shape for forming second vee-shaped gap means between said third and fourth electrode means.

3. Apparatus as described in claim 1 further including:
   first fiber light guiding means in light exchanging relation with said plate means for forming said optical input port means, and
   second fiber light guiding means in light exchanging relation with said plate means for forming said optical output port means.

4. Apparatus as described in claim 3 wherein:
   said first and second fiber light guiding means have respective first and second faces disposed perpendicular to the respective axes of said first and second fiber light guiding means, and
   said first and second faces are affixed to opposed surfaces of said plate means, whereby said path and said axes are co-lineal.

5. Apparatus as described in claim 3 wherein:
   said first and second light guiding means have respective first and second faces disposed at a non-normal angle to the respective axes of said first and second fiber light guiding means, and said first and second faces are affixed to opposed surfaces of said plate means, whereby said path and said axes are not colineal but said axes are parallel, whereby said light is beneficially concentrated.

6. Apparatus as described in claim 1 further including:

first and second barrier guidance electrode means coplanar with said first and second mutually coplanar electrode means, said first and second barrier guidance electrode means being affixed to said plate means in generally parallel spaced relation on either side of said first and second mutually coplanar electrode means, source means for applying a potential to said first and second barrier guidance electrode means.

7. Optical modulator apparatus comprising:

a plate of optically transparent material characterized by an electrically variable index of refraction and having:

first and second opposed major surfaces, and first and second opposed minor surfaces generally perpendicular to said major surfaces, first light guiding means in light exchanging relation with said plate at said first minor surface, second light guiding means in light exchanging relation with said plate at said second minor surface whereby light normally propagates in a concentrated beam from said first to said second light guiding means, and electrode means disposed at said major surfaces adapted, when excited, for variably deflecting said light beam from said second light guiding means according to the level of said excitation, said electrode means comprising at least first and second isolated mutually coplanar electrode means, said first coplanar electrode means being affixed to said first major surface and having a generally triangular shape, said second coplanar electrode means being affixed to said first major surface and having an internal shape conformal with said generally triangular shape for forming first vee-shaped gap means between said first and second coplanar electrode means, and said electrode means including cooperating electrode means affixed to said second major surface.

8. Apparatus as described in claim 7 wherein said cooperating electrode means comprises:

third and fourth isolated electrode means, said third electrode means being affixed to said second major surface and having a generally triangular shape, and said second electrode means being affixed to said second major surface and having an internal shape conformal with said generally triangular shape for forming second vee-shaped gap means between said third and said fourth coplanar electrode means.

9. Apparatus as described in claim 8 wherein said first and second vee-shaped gaps are disposed in aligned, similarly oriented relation.

10. Apparatus as described in claim 8 further including first and second barrier guidance electrode means at said first major surface in generally parallel coplanar spaced relation on either side of said first and second coplanar electrodes, said barrier guidance electrode means being adapted, when excited, beneficially to concentrate said light.

11. Apparatus as described in claim 8 including source means adapted to apply a first potential to said first and fourth electrode means and a second potential to said second and third electrode means.

12. Apparatus as described in claim 7 including source means adapted to apply opposite potentials respectively to said first and second electrode means.

* * * * *